United States Patent
Toyoda et al.

(10) Patent No.: US 6,218,717 B1
(45) Date of Patent: Apr. 17, 2001

(54) SEMICONDUCTOR PRESSURE SENSOR AND MANUFACTURING METHOD THEREFOF

(75) Inventors: Inao Toyoda, Okazaki; Hiroaki Tanaka, Kariya; Noboru Endo, Anjo, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/231,799

(22) Filed: Jan. 15, 1999

(30) Foreign Application Priority Data

Jan. 16, 1998 (JP) .................................. 10-006905

(51) Int. Cl.[7] .................................................. H01L 29/82
(52) U.S. Cl. ............................................ 257/419; 257/418
(58) Field of Search ................................ 257/415, 417, 257/418, 419

(56) References Cited

U.S. PATENT DOCUMENTS 4,814,856 * 3/1989 Kurtz et al. .
5,869,876 * 2/1999 Ishio et al. ............................ 257/419

FOREIGN PATENT DOCUMENTS

| 58-123780 | 7/1983 | (JP) . |
| 62-55629 | 11/1987 | (JP) . |
| 64-12239 | 1/1989 | (JP) . |
| 2-116174 | 4/1990 | (JP) . |
| 6-45618 | 2/1994 | (JP) . |

* cited by examiner

Primary Examiner—Ngân V. Ngô
(74) Attorney, Agent, or Firm—Pillsbury Winthrop LLP

(57) ABSTRACT

A semiconductor pressure sensor includes a semiconductor substrate having a diaphragm portion. A diaphragm formation region including the diaphragm portion is electrically insulated from a peripheral region therearound. Voltage is applied to the diaphragm formation region via a pad and a wire both formed on a surface of the semiconductor substrate, for fixing a potential of the diaphragm formation region when the sensor is put in an operating state. The fixed potential is set to be equal to or higher than a maximum potential of a gauge diffusion resistive layer formed in the diaphragm formation region. As a result, even when the maximum potential of the gauge diffusion resistive layer is a power supply voltage, it can be prevented that current leaks from the gauge diffusion resistive layer.

12 Claims, 3 Drawing Sheets

“SEMICONDUCTOR PRESSURE SENSOR AND MANUFACTURING METHOD THEREFOF”

CROSS REFERENCE TO RELATED APPLICATION

This application is based upon and claims the benefit of priority of prior Japanese Patent Application No. H.10-6905 filed on Jan. 16, 1998, the contents of which are incorporated herein by reference.

BACKGROUND OF THE INVENTION

1. Field of the Invention

The present invention relates to a semiconductor pressure sensor for detecting pressure and a manufacturing method thereof.

2. Description of Related Art

In a conventional semiconductor pressure sensor, a diaphragm portion having a thin thickness is formed in a silicon substrate. A plurality of gauge diffusion resistive layers (strain gauges) are formed on a surface of the diaphragm portion. As a result, displacement of the diaphragm portion is detected by strain gauges.

In this semiconductor pressure sensor, it is suggested that an electro-chemical etching is carried out with respect to the silicon substrate to accurately control the thickness of the diaphragm portion. In detail, a wafer is prepared by forming an n-type epitaxial layer on a p-type silicon substrate. When a diaphragm portion is formed, an anisotropic etching is carried out with respect to the p-type silicon substrate using an aqueous solution such as potassium hydroxide (KOH) or the like, in a state where a reverse voltage is applied to a region where the diaphragm portion is to be formed. At this time, because a pn junction in the wafer is reverse-biased, a depletion layer extending from the pn junction to a silicon substrate side is created. An front end of the depletion layer is exposed to the etchant, as the etching process advances. When the depletion layer is exposed to the etchant, the etching of the silicon substrate is ceased due to a difference in potential between the silicon substrate and the etchant. In this way, since the position at which the etching of the silicon substrate is ceased is specified by the thickness of the depletion layer, the diaphragm portion can be accurately formed.

In the semiconductor pressure sensor, a region (diaphragm formation region) where the diaphragm portion is formed in the epitaxial layer, is formed as an island region which is electrically insulated from the epitaxial layer (peripheral region) encompassing the diaphragm formation region. A plurality of (for example, four) gauge diffusion resistive layers are formed on a surface of the diaphragm formation region, and an integrated circuit is formed in the peripheral region. The plurality of gauge diffusion resistive layers are connected to form a bridge circuit. The integrated circuit supplies voltage to the bridge circuit. Therefore, the bridge circuit generates a voltage signal in correspondence with the displacement of the diaphragm portion. The potential of the diaphragm formation region is fixed by an aluminum wire running from the integrated circuit to the diaphragm formation region.

When the electro-chemical etching as described above is carried out, if current leaks from the integrated circuit formed in the peripheral region into the diaphragm formation region, the etching of the silicon substrate cannot be ceased at a desirable position. Therefore, for example, JP-A-6-45618 teaches that a diode is disposed in the aluminum wire for fixing the potential of the diaphragm formation region, which runs from the integrated circuit to the diaphragm formation region. The diode can prevent leak current from flowing from the integrated circuit into the diaphragm formation region. FIG. 5 is a schematic plan view of the semiconductor pressure sensor as described above.

FIG. 5 shows one semiconductor pressure sensor chip 101 among a large number of semiconductor pressure sensors formed in a wafer. In a diaphragm formation region 102, a plurality of gauge diffusion resistive layers (not shown) is formed and connected to make up a bridge circuit. In a peripheral region around the diaphragm formation region 102, an integrated circuit portion 103 is formed. Power supply voltage is supplied to the integrated circuit 103 via a pad 104.

A conductive pattern 105 for feeding voltage used for carrying out the electro-chemical etching is formed along scribing lines in a peripheral portion of the sensor chip 101. The conductive pattern 105 is electrically connected to the diaphragm formation region 102 by way of an aluminum wire 106. The aluminum wire 106 and the pad 104 are connected to each other by way of an aluminum wire 108. Diodes 107, 109 are disposed in the aluminum wires 106, 108, respectively.

Because the sensor chip 101 is structured as described above, when the electro-chemical etching is carried out, a positive voltage for creating a depletion layer is applied from the conductive pattern 105 to the diaphragm formation region 102 via the aluminum wire 106. At this time, the diode 109 prevents current from flowing into the integrated circuit portion 103 via the aluminum wire 108 and the pad 104. That is, leak current flowing into the integrated circuit portion 103 can be prevented by the diode 109. It is to be noted that, when the wafer is cut up (diced) into plural sensor chips along the scribing lines, the conductive pattern 105 is separated from each sensor chip.

When the semiconductor pressure sensor is brought in an operating state, voltage is supplied to the diaphragm formation region 102 via the pad 104, diode 109 and the aluminum wire 108. The potential of the diaphragm formation region 102 is fixed by the voltage thus supplied. Because the diode 107 is provided in the aluminum wire 106, it is possible to prevent leak current from flowing from the diaphragm formation region 102 to the conductive pattern remaining at the peripheral portion of the sensor chip 101.

The integrated circuit portion 103 has a power supplying circuit for supplying electric power to the bridge circuit formed by the gauge diffusion resistive layers. As one example of the power supplying circuits, JP-B-62-55629 teaches a constant current circuit which supplies constant current to the bridge circuit by disposing a resistor in a power supply line connected to the bridge circuit and controlling current flowing through the resistor to a constant value. In this case, a maximum potential applied to the gauge diffusion resistive layers is lowered from the voltage of the power supply line (power supply voltage) by a voltage drop at the resistor. Therefore, when the potential of the diaphragm formation region 102 is fixed by the power supply voltage supplied via the pad 104 and the diode 109, the fixed potential becomes higher than the maximum potential applied to the gauge diffusion resistive layers. As a result, it is possible to prevent current from leaking out of the gauge diffusion resistive layers.

The inventors of the present invention considered a power supplying circuit having a circuit structure shown in FIG. 4, as the power supplying circuit provided in the integrated circuit portion 103. In the power supplying circuit shown in FIG. 4, a transistor 301 is provided on a ground side of a bridge circuit 200 formed by gauge diffusion resistive layers 201–204, and a power supply side thereof is directly connected to a power supply line L. Resistors 302, 303, an operational amplifier 304, a variable resistor 305, and a transistor 306 constitute a constant current circuit. The constant current circuit causes constant current to flow between the collector and emitter of the transistor 306. As a result, current proportional to that constant current flows between the collector and emitter of the transistor 301, i.e., through the bridge circuit 200. In this case, the value of the constant current flowing through the bridge circuit 200 is adjustable by adjusting a resistance value of the variable resistor 305 by means of trimming or the like.

According to the power supplying circuit as shown in FIG. 4, a value of voltage applied to the bridge circuit 200 can be increased comparing to the power supplying circuit in which the resistor is disposed in the power supply line connected to the bridge circuit. Therefore, even when, for example, a dry battery is used as a power supply source, output voltages V1, V2 of the bridge circuit 200 can be made large.

However, in the power supplying circuit shown in FIG. 4, the maximum potential of the gauge diffusion resistive layers 201–204 becomes equal to a power supply voltage Vcc. The potential of the diaphragm formation region 102 is lowered from the power supply voltage Vcc by a forward voltage drop of the diode 109. For this reason, the maximum potential of the gauge diffusion resistive layers 201–204 becomes higher than the potential of the diaphragm formation region 102, thereby causing leak current flowing from the gauge diffusion resistive layers 201–204. If the leakage of current from the gauge diffusion resistive layers occurs, detection sensitivity of the pressure sensor lowers.

SUMMARY OF THE INVENTION

It is an object of the present invention to provide a semiconductor type pressure sensor which can prevent current leakage from gauge diffusion resistive layers, even when the maximum potential of the gauge diffusion resistive layers is equal to a power supply voltage.

In order to achieve such an object, in the semiconductor pressure sensor according to the present invention, voltage is applied from an electrode to a diaphragm formation region via a first pad and a second wire both formed on a surface of an n-type semiconductor layer, for fixing a potential of the diaphragm formation region when the sensor is put in an operating state. The electrode has a potential equal to or higher than a maximum potential of a gauge diffusion resistive layer formed in the diaphragm formation region. As a result, even when the maximum potential of the gauge diffusion resistive layer becomes a power supply voltage by power supply from the circuit portion, it can be prevented that current leaks from the gauge diffusion resistive layer.

BRIEF DESCRIPTION OF THE DRAWINGS

These and other objects, features, and characteristics of the present invention will be appreciated from a study of the following detailed description, the appended claims, and drawings, all of which form a part of this application. In the drawings:

DETAILED DESCRIPTION OF THE PREFERRED EMBODIMENTS

The preferred embodiments of the present invention will be described in reference to the accompanying drawings.

Figure 1:
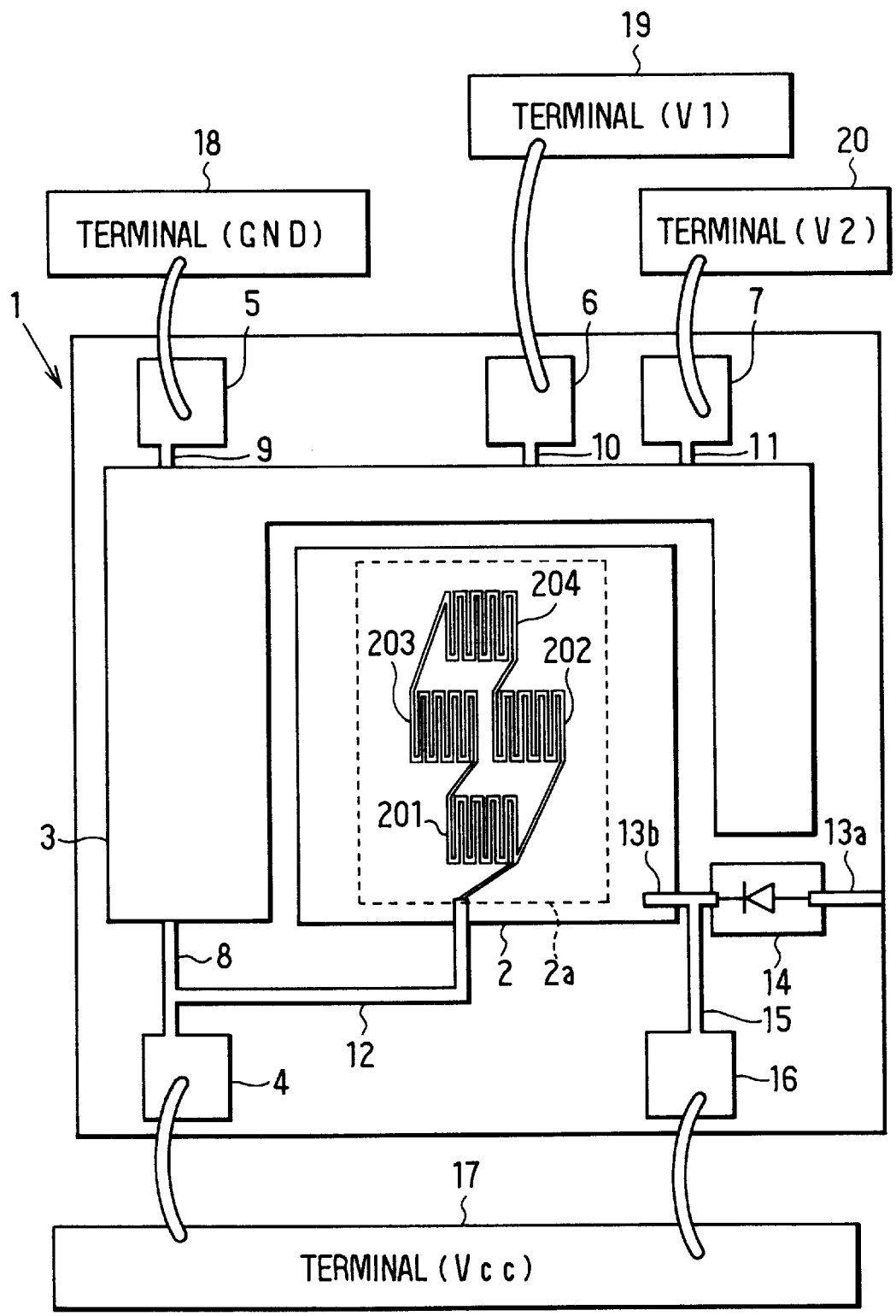
FIG. 1 is a plan view of a semiconductor pressure sensor according to a first embodiment of the present invention.
Figure 4:
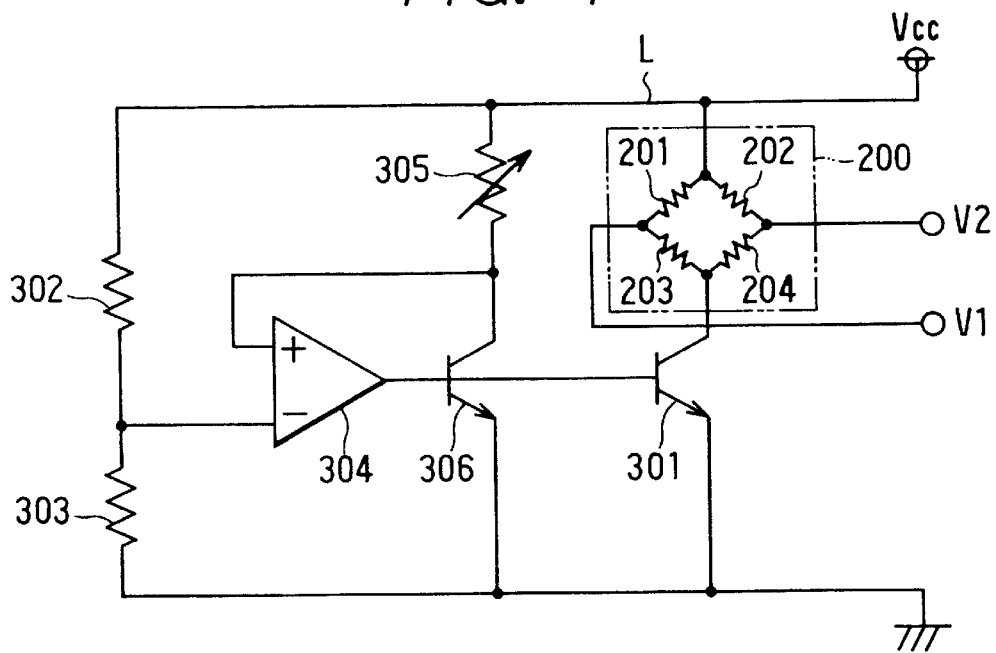
FIG. 4 is a circuit diagram of a power supplying circuit for supplying electric power to a bridge circuit formed by gauge diffusion resistive layers.

In FIG. 1, four gauge diffusion resistive layers 201–204 are formed in a diaphragm formation region 2 of a sensor chip 1. The gauge diffusion resistive layers are connected by wires to form a bridge circuit 200 as shown in FIG. 4. A dotted line 2a in the diaphragm formation region 2 designate a diaphragm portion 2a having a thin thickness.

An integrated circuit portion 3 and pads 4–7 are formed in a peripheral region around the diaphragm formation region 2. The pads 4–7 are electrically connected to the integrated circuit portion 3 by aluminum wires 8–11. Also, the pad 4 is electrically connected to the gauge diffusion resistive layers 201–204 by an aluminum wire 12.

A power supplying circuit (composed of circuit elements 301–306) shown in FIG. 4 is provided in the integrated circuit portion 3. The power supplying circuit feeds constant current to the bridge circuit 200 via an aluminum wire (not shown).

Figure 5:
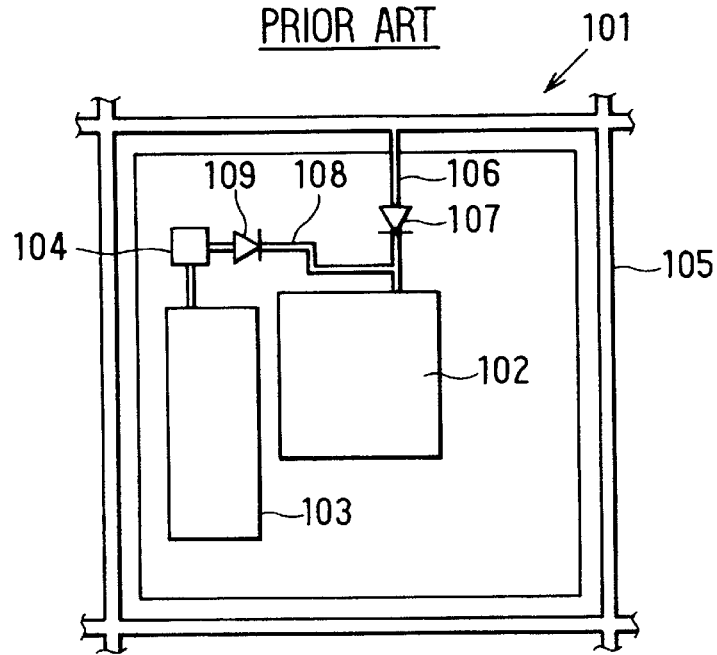
FIG. 5 is a plan view illustrating a conventional semiconductor pressure sensor.

Further, aluminum wires 13a, 13b are formed from one side of the sensor chip 1 up to the diaphragm formation region 2. A diode 14 having a pn junction is interposed between the wires 13a and 13b. The aluminum wire 13a is connected to a conductive pattern for feeding voltage (corresponding to the conductive pattern 105 shown in FIG. 5) which is formed along a scribing line region before dicing of a wafer. Due to this arrangement, when an electro-chemical etching is carried out, a positive voltage can be applied to the diaphragm formation region 2 via the aluminum wire 13a, diode 14 and the aluminum wire 13b.

An aluminum wire 15 is connected between the aluminum wire 13b and a pad 16. The pad 16 is for fixing the potential of the diaphragm formation region 2.

It is to be noted that the pads 4, 16 are connected to a power supply terminal 17 by respective bonding wires, the pad 5 is connected to a ground terminal 18 by a bonding wire, and the pads 6, 7 are connected to signal output terminals 19, 20 by bonding wires, respectively. The bonding of the wires is carried out after the sensor chip 1 is assembled in a case (not shown).

Next, the manufacturing method of the above-described semiconductor pressure sensor will be described in reference to FIGS. 2 and 3.

Figure 2:
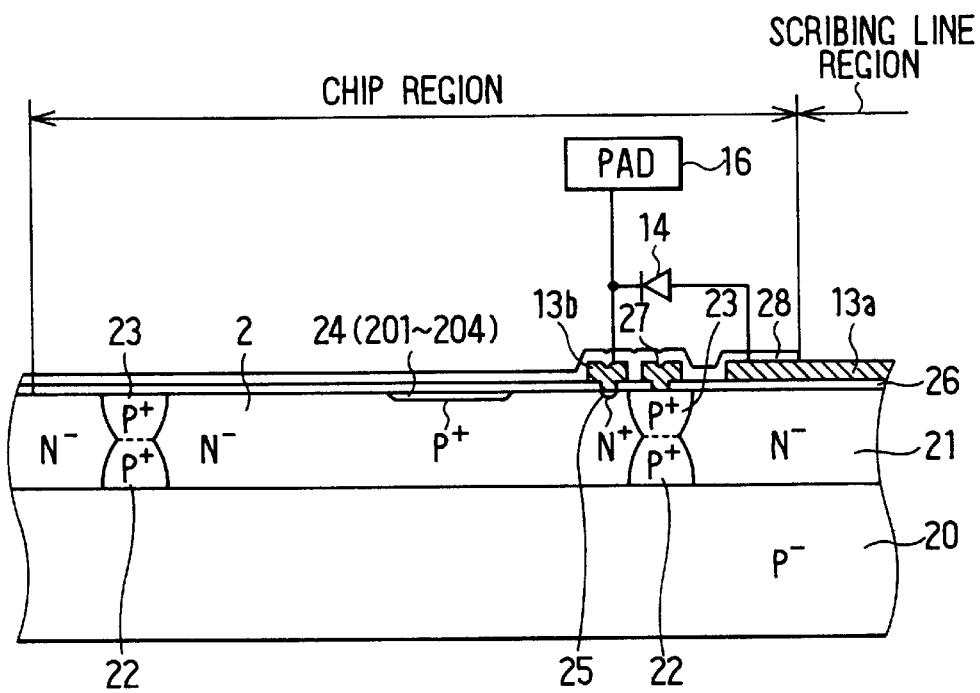
FIG. 2 is a sectional view of a semiconductor pressure sensor wafer for explaining a manufacturing method of the semiconductor pressure sensor shown in FIG. 1.
Figure 3:
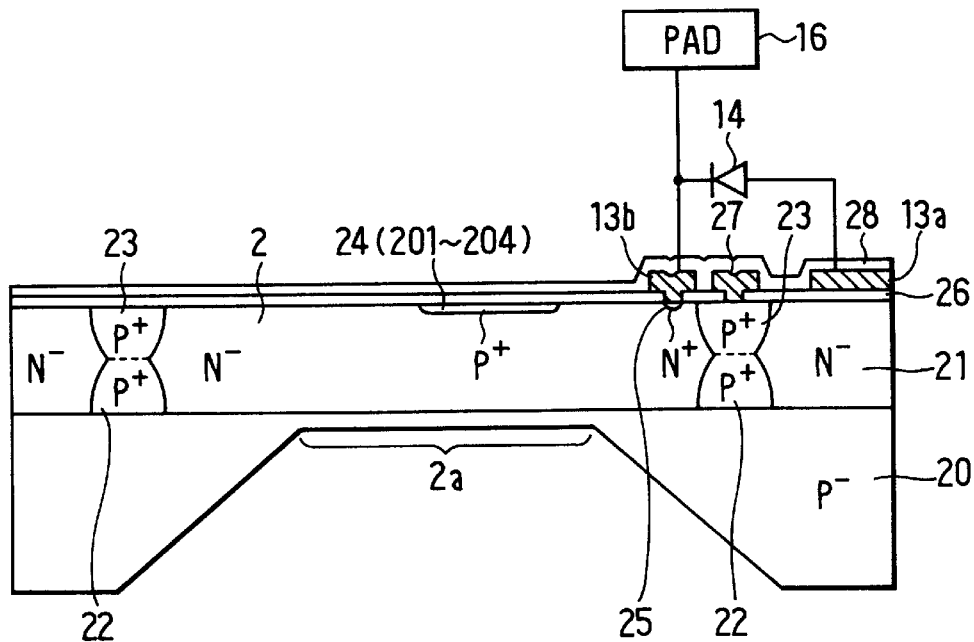
FIG. 3 is a sectional view of the semiconductor pressure sensor completed by the manufacturing method.

As shown in FIG. 2, a wafer in which a p$^+$-type embedded layer 22 and an n$^-$-type epitaxial layer 21 are formed on a p$^-$-type monocrystalline silicon substrate 20 is prepared. Then, a p$^+$-type diffusion layer 23 is formed in the epitaxial layer 21, thereby insulating the diaphragm formation region 2 from the peripheral region therearound. After that, a p$^+$-type diffusion resistive layer 24 becoming the gauge diffusion resistive layers 201–204 and an n$^+$-type diffusion layer 25 for ohmic contact are formed in the diaphragm formation region 2. Further, the integrated circuit portion 3 shown in FIG. 4 and the diode 14 are formed in the peripheral region of the epitaxial layer 21.

An insulation layer (SiO$_2$ layer) 26 is formed on the epitaxial layer 21. The aluminum wire 13b and an aluminum wire 27 (not shown in FIG. 1) for fixing the p$^+$-type diffusion layer 23 to a low potential are formed on the insulation layer 26. The aluminum wire 13a is formed from a chip region to a scribing line region in the peripheral region. Further, the pads 4–7 and 16, and the aluminum wires 8–11 and 15 shown in FIG. 1 are also formed on the wafer. After that, a passivation film 28 is formed on a surface of the wafer. Holes are formed in the passivation film 28 corresponding to the pads and the like.

Next, a mask made of a nitride film in which a predetermined region thereof is opened, is formed on a rear surface of the silicon substrate 20. The diaphragm portion 2a is formed by etching a predetermined region of the silicon substrate 20 with the mask formed in the above-described manner by an electro-chemical etching process. In this case, a negative voltage is applied to KOH solution, and a positive voltage is applied to the aluminum wire 13a so that a positive voltage is applied to the epitaxial layer 21 via the aluminum wire 13a, diode 14, aluminum wire 13b and the diffusion layer 25. After the diaphragm portion 2a is formed in this way, the wafer is cut up (diced) into plural sensor chips along the scribing line region.

After each of the semiconductor pressure sensor chips is assembled in a case, the pads 4, 16 are wire-bonded to a power supply terminal 17, the pad 9 is wire-bonded to the ground terminal 18, and the pads 6, 7 are respectively wire-bonded to the signal output terminals 19, 20.

According to the preferred embodiment as described above, the aluminum wire 108 shown in FIG. 5 is not formed between the pad 4 and the aluminum wire 13b. Therefore, even when a voltage to carry out electro-chemical etching is applied to the aluminum wire 13b, no leak current occurs from the integrated circuit portion 3 therethrough.

Since the pad 16 is electrically connected to the power supply terminal 17 by a bonding wire, the potential of the diaphragm formation region 2 is fixed to a power supply voltage Vcc by the pad 16 and the aluminum wire 15 when the semiconductor pressure sensor is put in an operating state. Therefore, when electric power is supplied to the gauge diffusion resistive layers 201–204 by a circuit shown in FIG. 4, although the maximum potential of the gauge diffusion resistive layers 201–204 becomes the power supply voltage Vcc, it does not becomes higher than the fixed voltage of the diaphragm formation region 2. Therefore, no current leakage occurs from the gauge diffusion resistive layers 201–204.

Since the diode 14 is connected between the aluminum wires 13a and 13b, it is prevented that leak current flows from the diaphragm formation region 2 to a side end face of the sensor chip via the aluminum wire 13a.

It is to be noted that, although the pad 16 is wire-bonded to the power supply terminal 17 in the above-described embodiment, it may be wire-bonded to the pad 4.

The aluminum wire 13a and the diode 14 connected to the voltage feeding conductive pattern formed along the scribing lines are not limited to these shown in FIG. 1. For example, an aluminum wire may be formed to connect the pad 16 with the voltage feeding conductive pattern, and a diode may be disposed in the aluminum wire so that a cathode of the diode is connected to the pad 16.

Further, when the semiconductor pressure sensor is put in the operating state, if the semiconductor pressure sensor chip has a structure by which leak current can be prevented from flowing from the diaphragm formation region 2 to the side end face of the sensor chip, the diode 14 to block the leak current can be dispensed with.

What is claimed is:

1. A semiconductor pressure sensor comprising:
    a p-type semiconductor substrate;
    an n-type semiconductor layer formed on a p-type semiconductor substrate, wherein a portion of the n-type semiconductor layer becomes a diaphragm portion as a result that a predetermined region of the p-type semiconductor substrate is etched by an electro-chemical etching process;
    at least one p-type gauge diffusion resistive layer formed in the diaphragm portion;
    an insulating region for insulating a diaphragm formation region including the diaphragm portion from a peripheral region therearound in the n-type semiconductor layer;
    a circuit portion formed in the peripheral region to be electrically connected with the gauge diffusion resistive layer, for supplying electric power thereto;
    a first wire formed on a surface of the n-type semiconductor layer, through which a voltage for carrying out the electro-chemical etching is applied to said diaphragm formation region;
    a second wire formed on the surface of the n-type semiconductor layer, for supplying a voltage to fix a potential of the diaphragm formation region;
    a first pad formed on the surface of the n-type semiconductor layer and connected to the second wire; and
    an electrode connected to the first pad by wire-bonding, the electrode having a potential equal to or higher than a maximum potential of the gauge diffusion resistive layer.

2. A semiconductor pressure sensor according to claim 1, further comprising:
    a diode disposed in the first wire,
    wherein the second wire is connected to the first wire, and the diode is arranged so that a cathode of the diode is connected to the second wire via the first wire to prevent current from flowing through the first wire in a direction from the diaphragm formation region to the peripheral region.

3. A semiconductor pressure sensor according to claim 1, wherein said electrode is a terminal for feeding a power supply voltage to both the circuit portion and the gauge diffusion resistive layer.

4. A semiconductor pressure sensor according to claim 3, further comprising:
    a second pad connected to the terminal for feeding the power supply voltage;
    a third wire connected between the second pad and the gauge diffusion resistive layer,
    wherein the power supply voltage is supplied to the gauge diffusion resistive layer via the second pad and the third wire when the semiconductor pressure sensor is put in an operating state.

5. A semiconductor pressure sensor according to claim 4, wherein the first and second wires are electrically disconnected from the third wire.

6. A semiconductor pressure sensor according to claim 1, wherein the circuit portion comprises a constant current supplying current connected to a ground side of the gauge diffusion resistive layer for supplying constant current thereto.

7. A semiconductor pressure sensor according to claim 3, wherein the power supply voltage is generated by a dry battery.

8. A semiconductor pressure sensor comprising:
- a semiconductor substrate having a diaphragm portion which is a pressure receiving portion, wherein a diaphragm formation region including the diaphragm portion is electrically insulated from a peripheral region therearound;
- resistive layers formed on the diaphragm portion, resistances of the resistive layers varying in accordance with displacement of the diaphragm portion and being connected to form a bridge circuit;
- a constant current supplying circuit connected to a ground side of the bridge circuit, for supplying constant current thereto;
- a potential fixing circuit for fixing a potential of the diaphragm formation region,
- wherein the potential of the diaphragm formation region fixed by the potential fixing circuit is set to be equal to or higher than the maximum potential of the bridge circuit when the constant current is supplied thereto.

9. A semiconductor pressure sensor according to claim 8, wherein the semiconductor substrate is composed of a p-type semiconductor substrate and an n-type semiconductor layer formed thereon, and the diaphragm portion is formed by the n-type semiconductor layer and the p-type semiconductor substrate which is thinned by etching.

10. A semiconductor pressure sensor according to claim 8, wherein the diaphragm formation region is electrically insulated from the peripheral region by forming a p-type semiconductor layer in the n-type semiconductor layer to encompass the diaphragm formation region.

11. A semiconductor pressure sensor according to claim 8, wherein a power supply side of the bridge circuit is directly connected to a power supply terminal via a first wire and a first pad both formed on the peripheral region.

12. A semiconductor pressure sensor according to claim 8, wherein the potential fixing circuit includes a second pad connected to a power supply terminal and a second wire connected between the second pad and the diaphragm formation region, and the potential of the diaphragm formation region is fixed to a power supply voltage.

* * * * *